(12) United States Patent
Boutaghou

(10) Patent No.: US 6,583,963 B2
(45) Date of Patent: **\*Jun. 24, 2003**

(54) APPARATUS TO IMPROVE SHOCK CAPABILITY OF DISC DRIVES

(75) Inventor: Zine-Eddine Boutaghou, Vadnais Heights, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,363

(22) Filed: Oct. 7, 1998

(65) Prior Publication Data

US 2001/0033459 A1 Oct. 25, 2001

Related U.S. Application Data

(60) Provisional application No. 60/061,271, filed on Oct. 7, 1997.

(51) Int. Cl.[7] .................. G11B 21/22; G11B 5/54; G11B 33/14
(52) U.S. Cl. ............... 360/254.7; 360/254.3; 360/97.02
(58) Field of Search ............... 360/110, 128, 360/130.3, 130.34, 105, 97.02, 254.3, 254.4, 254.5, 254.7, 254.8, 254.9, 97.01

(56) References Cited

U.S. PATENT DOCUMENTS

| | | | | | |
|---|---|---|---|---|---|
| 3,984,873 | A | * | 10/1976 | Pejcha | 360/254.3 |
| 4,939,611 | A | * | 7/1990 | Connolly | 360/265.1 |
| 5,239,431 | A | * | 8/1993 | Day et al. | 360/98.08 |
| 5,444,678 | A | * | 8/1995 | Ogata | 369/13.23 |
| 5,448,436 | A | * | 9/1995 | Albrecht | 360/256.4 |
| 5,453,889 | A | * | 9/1995 | Alt | 360/97.01 |
| 5,471,439 | A | * | 11/1995 | Katayama et al. | 369/13.17 |
| 5,495,376 | A | * | 2/1996 | Wasson et al. | 360/75 |
| 5,550,695 | A | * | 8/1996 | Matsumoto | 360/254.4 |
| 5,754,355 | A | * | 5/1998 | Nakamura et al. | 360/73.03 |
| 5,831,795 | A | * | 11/1998 | Ma et al. | 360/254.3 |
| 5,926,347 | A | * | 7/1999 | Kouhei et al. | 360/254.3 |
| 6,028,745 | A | * | 2/2000 | Nguyen et al. | 360/254.3 |
| 6,055,134 | A | * | 4/2000 | Boutaghou | 360/254.4 |
| 6,115,214 | A | * | 9/2000 | Allsup et al. | 360/254.3 |
| 6,301,073 | B1 | * | 10/2001 | Gillis et al. | 360/254.8 |
| 6,341,051 | B2 | * | 1/2002 | Hachiya et al. | 360/265.1 |

FOREIGN PATENT DOCUMENTS

| GB | 2178585 A | * | 2/1987 |
|---|---|---|---|
| JP | 10-241310 A | * | 9/1998 |

OTHER PUBLICATIONS

TDB–ACC–NO: NN9607255, "Scrub Zone for Disk Drive Using Load/Unload", Jul. 1996, IBM Technical Disclosure Bulletin, v. 39, No. 7, p. 255–258.*

\* cited by examiner

*Primary Examiner*—Hoa T. Nguyen
*Assistant Examiner*—Julie Anne Watko
(74) *Attorney, Agent, or Firm*—Jennifer M. Buenzow

(57) ABSTRACT

A head loading ramp structure, located near the inner diameter of the discs of a disc drive, for increasing the load applied to the heads by the head suspension when the heads are moved to a park location near the inner diameter of the discs. In a first embodiment, the ramp structure is stationary and a portion of the disc surface is accessed for normal read/write operations with the increased load applied. In a second embodiment, the ramp structure is moveable and engages the head suspension to increase the load applied to the heads only when the heads are parked during non-operational conditions. The ramp structure optionally includes disc snubber features to reduce disc coning and minimize the axial movement of the ramp structure in response to applied mechanical shocks.

17 Claims, 6 Drawing Sheets

APPARATUS TO IMPROVE SHOCK CAPABILITY OF DISC DRIVES

CROSS-REFERENCE TO RELATED APPLICATION

This application claims the benefit of United States Provisional Application Ser. No. 60/061,271 filed Oct. 7, 1997.

BACKGROUND OF THE INVENTION

This invention relates generally to the field of rigid disc drives, and more particularly, but not by way of limitation, to apparatus for improving the capability of a disc drive to withstand the application of mechanical shocks, particularly under non-operational conditions.

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable. Moreover, future disc drive products are being developed which must be capable of withstanding non-operating shocks of up to 1000 G without suffering fatal damage.

One of the undesirable possible consequences of mechanical shocks applied to a disc drive is the phenomenon commonly referred to in the industry as "head slap". This condition occurs when the applied mechanical shock is large enough to overcome the load force applied to the head assembly by the head suspension. Under such conditions, the head assembly lifts away from the disc surface, and when the shock event terminates, the head assembly moves back into contact with the disc in an uncontrolled manner, potentially causing damage to the head assembly, disc or both.

The problems associated with head slap have been exacerbated by the introduction of disc drives including smaller slider assemblies to support the read/write heads, which, by definition, require a smaller amount of applied load force and are, therefore, proportionally more susceptible to uncontrolled unloading due to the application of lesser mechanical shocks. For instance, it is typical for the so-called "30% slider" (0.049" long×0.039" wide×0.012" high) to be loaded into cooperative relationship with a disc by a force of only about 4.0 grams. With such a low load force applied to the slider, the amount of applied mechanical shock necessary to cause head slap is also relatively low.

One common preventive measure used in the industry to prevent head slap is to use ramps closely adjacent the outer diameter of the discs to unload the heads from engagement with the discs when a non-operating condition, such as loss of disc drive power, is detected. Since the heads are no longer resting on the disc surface, applied mechanical shocks cannot cause uncontrolled contact between the heads and discs. Once proper operational conditions are restored, the head assemblies are reloaded into engagement with the discs for normal disc drive operation.

Such ramp-loading/unloading schemes, however, typically leave the read/write heads supported only by the delicate gimbal portion of the head suspension during non-operational conditions. In this condition, mechanical shocks applied to the disc drive, if of sufficient magnitude, can result in permanent deformation of the gimbal portion of the head suspension, and potentially fatal damage to the disc drive.

Yet another potentially fatal condition related to applied mechanical shocks relates to the effect of such applied mechanical shocks on the discs themselves. Since the discs are supported only at their inner diameters, mechanical shocks applied in parallel with the spin axis of the discs tend to displace the outer diameters of the discs to positions "out-of-plane" from the inner diameters of the discs. This phenomenon is often referred to as "disc coning". Disc coning can result in fatal damage to the disc drive in several modes: 1) if the outer diameters of the discs are axially displaced to an extent great enough to cause contact between the discs and the actuator head mounting arms, particles can be generated within the disc drive which can migrate to the interface between the heads and discs, causing loss of data or fatal damage to the heads, discs or both; 2) if contact between the discs and the actuator head mounting arms due to disc coning is severe enough, this contact can cause the heads to be lifted away from the discs, resulting in head slap, as described above.

A need clearly exists, therefore, for an apparatus for reducing or eliminating head slap in response to applied mechanical shock. It would be a further benefit if the apparatus also acted to minimize the effects of disc coning in response to applied mechanical shock.

SUMMARY OF THE INVENTION

The present invention is a head loading ramp structure, located near the inner diameter of the discs of a disc drive, for increasing the load applied to the heads by the head suspension when the heads are moved to a park location near the inner diameter of the discs. In a first embodiment, the ramp structure is stationary and a portion of the disc surface is accessed for normal read/write operations with the increased load applied. In a second embodiment, the ramp structure is moveable and engages the head suspension to increase the load applied to the heads only when the heads are parked during non-operational conditions. The ramp structure optionally includes disc snubber features to reduce disc coning and minimize the axial movement of the ramp structure in response to applied mechanical shocks.

It is an object of the invention to provide a mechanism for increasing the tolerance of a disc drive to applied mechanical shocks.

It is another object of the invention to provide a mechanism for preventing separation of the heads from the discs in a disc drive in response to applied mechanical shocks.

It is another object of the invention to minimize disc coning in a disc drive in response to the application of mechanical shocks.

It is another object of the invention to achieve the previously stated objects in a manner which is simple and economical to implement in a high volume manufacturing environment.

The manner in which these objects are achieved by the present invention, along with other features, benefits and advantages of the invention, can best be understood by a review of the following DETAILED DESCRIPTION OF THE INVENTION, when this is read in conjunction with an examination of the accompanying drawings.

BRIEF DESCRIPTION OF THE DRAWINGS

FIGS. 3-1 through 3-3 are simplified diagrammatic elevation views illustrating various operational modes of a disc drive implementing the first embodiment of the invention.

DETAILED DESCRIPTION OF THE INVENTION

Figure 1:
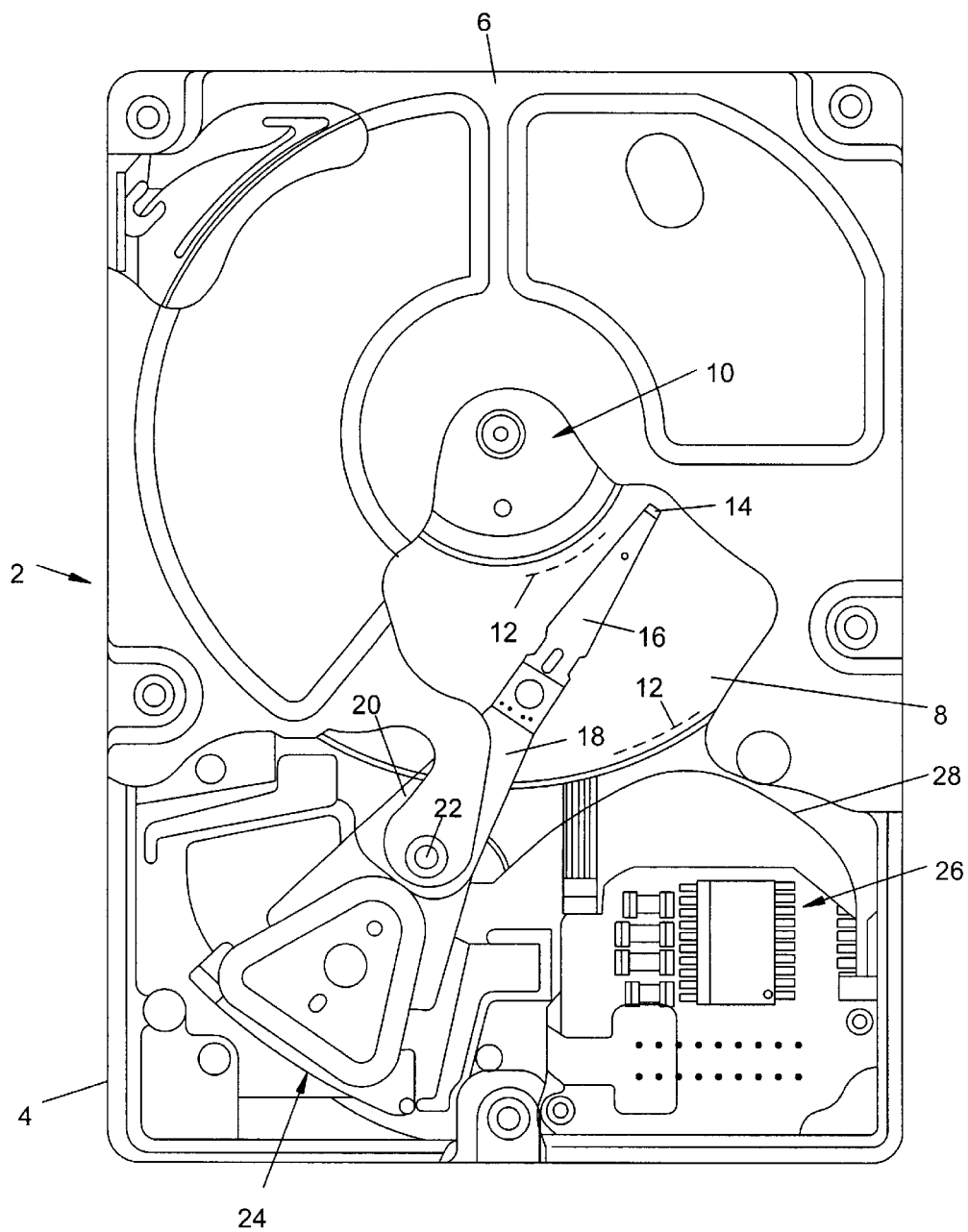
FIG. 1 is a plan view of a prior art disc drive in which the present invention is particularly useful.

Turning now to the drawings and specifically to FIG. 1, shown is a plan view of a prior art disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes one or more discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

The prior art disc drive 2 of FIG. 1 is of the type referred to in the industry as a "contact start-stop" drive. That is, when power to the disc drive 2 is removed, the head assemblies 14 are moved to a park position near the inner diameter of the discs 8, as shown in the figure, and the actuator assembly is latched at this park position. As the discs 8 cease to spin, the head assemblies 14 come to rest in contact with the surfaces of the discs 8, and remain in contact with the discs 8 until such time as power is restored to the disc drive 2. As part of the start-up sequence which the disc drive executes upon restoration of power, the spindle motor 10 is accelerated to its operational speed while the actuator remains latched at the park position. Once the spindle motor 10 reaches sufficient speed to fly the head assemblies 14, the actuator is unlatched, and the remainder of the start-up initialization is executed.

As previously mentioned, the recently implemented small head assemblies 14 require that the head suspensions 16 exert only a small amount of load force to the head assemblies 14 in order to maintain the head assemblies 14 in their desired operational relationship to the discs 8. This small load force is advantageous during the contact start-stop operations described immediately above, since the small load force minimizes the possibility of frictionally-induced damage to the head assemblies 14 and discs 8 during the short time interval when the discs 8 are spinning at speeds too slow to fly the head assemblies 14.

However, as noted above, disc drives of the current generation are commonly specified to be able to withstand the application of mechanical shocks on the order of 1000 G during non-operational conditions. With this requirement, the small amount of load force applied to the head assemblies 14 is a detriment, since it lowers the amount of mechanical shock that can be applied to the disc drive without lifting the head assemblies 14 away from the surfaces of the discs 8, resulting in head slap and potential damage to the head assemblies 14, the discs 8 or both. It is the prevention of head slap in response to applied mechanical shock to which the present invention is directed.

Figure 2:
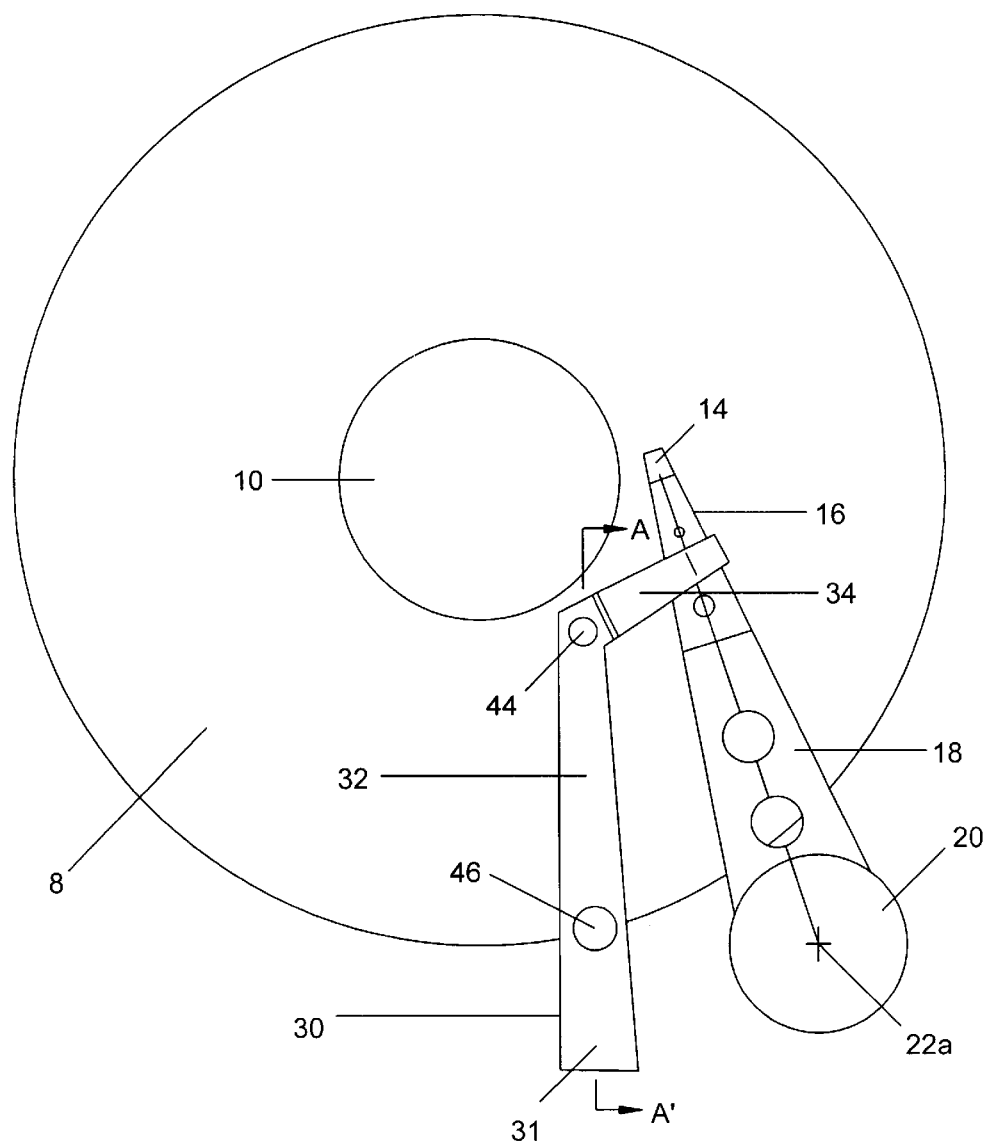
FIG. 2 is a simplified plan view of a disc drive showing a first embodiment of the present invention.

Turning now to FIG. 2, shown is a simplified plan view of a disc drive in which a first embodiment of the present invention is illustrated.

FIG. 2 shows a disc 8 mounted for rotation on a spindle motor 10, and an actuator housing 20 pivotable about a pivot axis 22*a*, representative of the pivot shaft 22 of FIG. 1. The actuator housing 20 includes a radially extending actuator head mounting arm 18 attached to a head suspension 16 which in turn mounts and supports a head assembly 14, all as previously described in relationship to FIG. 1 above. The actuator motor (24 in FIG. 1) has been omitted for clarity.

FIG. 2 also shows a ramp structure 30 which forms a part of the present invention. The ramp structure 30 includes a mounting end 31 which is used, in this first embodiment, to mount the ramp structure in a fixed relationship to the disc drive base member (4 in FIG. 1) and thus in a fixed relationship to the discs 8 and spindle motor 10.

The ramp structure 30 also includes an arm portion 32 which extends radially over the discs 8 and a ramp portion 34 which extends at an angle from the arm portion 32 and overlaps a portion of the disc 8 swept by the range of motion of the head assembly 14. Specifically, the ramp portion 34 of the ramp structure 30 extends over the head suspension 16 when the head assembly 14 is moved near the inner diameter of the disc 8.

It is envisioned that the disc drive is of the type in which the head assemblies 14 are parked at a park location closely adjacent the inner diameter of the discs 8, such as the position shown in FIG. 2. Thus, when the head assemblies 14 are at the park location, the ramp portion 34 of the ramp structure 30 overlaps the head suspension 16 and acts to encourage the head assembly 14 toward the disc 8, as will be discussed in detail below.

Figures 1, 3:
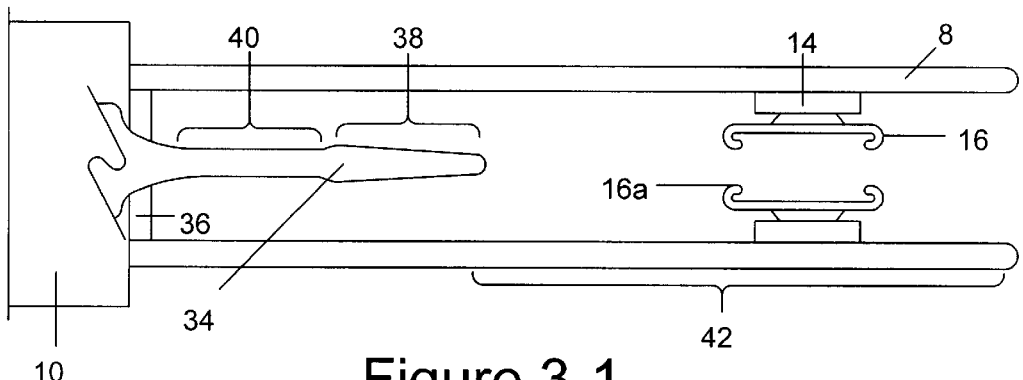
Figures 2, 3:
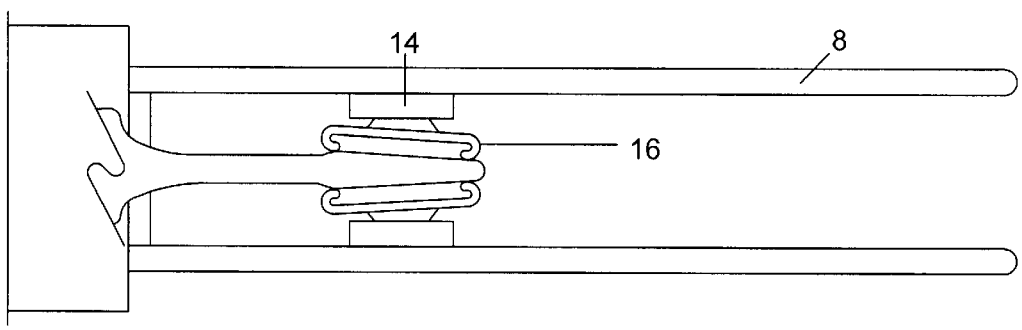
Figure 3:
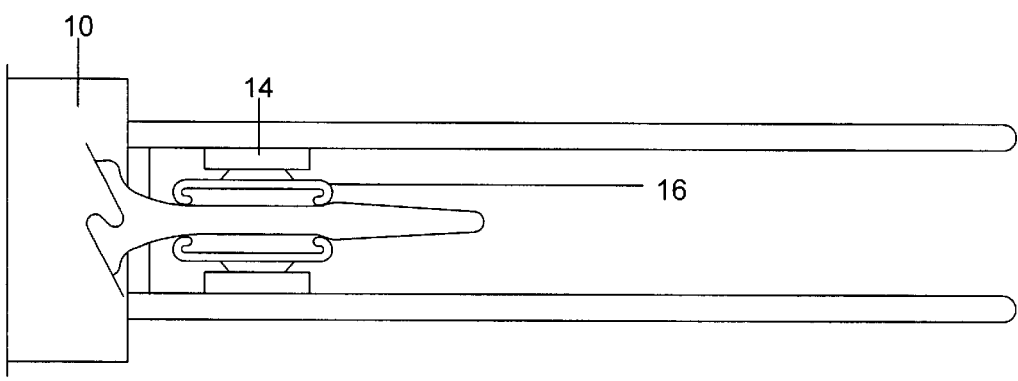

The manner in which the present invention acts to prevent head slap during non-operational conditions can best be seen in FIGS. 3-1 through 3-3, which are simplified diagrammatic elevation views showing the operation of the disc drive of FIG. 2 during movement of the heads over various portions of the range of motion of the actuator.

FIGS. 3-1 through 3-3 show a pair of discs 8 mounted on a portion of a spindle motor 10, and one of skill in the art will appreciate that the scope of the present invention is not limited by the specific number of discs 8 incorporated in the disc drive. Furthermore, as previously mentioned, FIGS. 3-1 through 3-3 are simplified diagrammatic elevation views, in which the vertical dimensions of the various components are greatly exaggerated for illustrative purposes.

FIG. 3-1 identifies other elements common to FIGS. 3-1 through 3-3. Specifically, FIG. 3-1 shows that the discs 8 are separated by a disc spacer 36, in a manner well known in the art, and that the ramp portion 34 of the ramp structure (30 in FIG. 2) is further comprised of a double-beveled end portion 38 and a park portion 40.

In FIGS. 3-1 through 3-3, two head assemblies 14 are shown in operational relationship with the discs 8. These head assemblies are supported by head suspensions 16, shown generally in sectional view. For purposes of the ensuing discussion, the terms "top", "upper", "upward" and similar designations are intended to indicate directions and component surfaces away from the surface of the discs 8, while complementary terms "bottom", "lower", "downward" and similar designations relate to directions and component surfaces toward the disc surfaces.

In the figures, it can be seen that the head suspensions 16 include rolled or rounded contact features 16*a* on their upper surfaces. These contact features 16*a* are the portions of the head suspensions 16 that make contact with the ramp structure (30 in FIG. 2), as will be discussed in detail below.

The figures also show that the ramp portion 34 of the ramp structure 30 is made up of a double-beveled end portion 38 and a flat park portion 40. Since the ramp structure in this embodiment of the invention is fixedly mounted to the disc drive base member (4 in FIG. 1), the ramp portion 34 is fixedly positioned near the inner extent of the range of motion of the actuator. This means that the head assemblies 14 are free to move as in prior art disc drives over the majority of their range of motion, for example, that portion of the disc radius designated by numerical reference 42.

FIG. 3-2 shows the head assemblies 14 as having moved to a position where the contact features 16*a* of the head suspensions 16 have engaged the end portion 38 of the ramp portion 34 of the ramp structure. As the contact features 16*a* first contact the end portion 38 and as the head assemblies 14 continue to move inward on the discs 8, the beveled nature of the end portion 38 causes the head suspensions 16 to be encouraged downward, i.e., in the direction of the discs 8. This causes additional load force to be applied to the head/disc interface, and thus acts to prevent the head assemblies 14 from lifting away from the discs 8 in response to applied mechanical shocks.

FIG. 3-3 shows the head assemblies 14 at their park position close to the inner diameter of the discs 8 and near the spindle motor 10. When the head assemblies 14 are at this park location, the head suspensions 16 are positioned over the park portion (40 in FIG. 3-1) of the ramp portion 34. In the particular embodiment of the ramp structure 30 shown in FIGS. 3-1 through 3-3, the park portion 40 is shown as a detent. That is, when the head assemblies 14 are parked, the head suspensions 16 lie on a flat surface that is defined at either end by a downward extending bevel (not separately designated). If the head assemblies 14 were moved to the park location as a result of a power loss to the disc drive, a typical voice coil actuator motor (24 in FIG. 1) would be unable to maintain the actuator at this position. Therefore, the detent nature of the park portion 40 serves to hold the head assemblies at the park position until such time as power is restored to the disc drive and the actuator motor can move the head suspensions 16 out of the park portion 40 of the ramp portion 34 and into normal cooperative engagement with the data-storage portions of the discs 8.

While the detent nature of the park portion 40 shown in FIGS. 3-1 through 3-3 would act as an actuator latch, the latching force generated would potentially not be sufficient to maintain the actuator at the park position in the presence of applied mechanical shocks of the magnitude typically specified for disc drives of the present and near future generations, i.e., approximately 1000 G. Therefore, it is preferable that the latching of the actuator be provided by a separate mechanism. Examples of actuator latching mechanisms are well known in the art, and the scope of the present invention is not envisioned to be limited by the specific form of actuator latch incorporated in the disc drive in which the present invention is implemented.

One of skill in the art will appreciate, upon examining FIGS. 3-1 through 3-3, that, at all positions of the head assemblies 14 where the head suspensions 16 are in contact with the beveled end portion 38, a twisting, or torque, force is also applied to the head suspensions 16. It should be recalled, however, that the vertical dimensions in the figures is greatly exaggerated for illustration purposes, and the amount of twist applied to the head suspensions 16 in actual practice of the invention is envisioned to be sufficiently small as to not affect the operation of the disc drive. The amount of load force increase provided by the ramp structure of the present invention is envisioned to be on the order of approximately 0.5 grams. That is, if the head suspensions 16 exert a normal load on the head assemblies 14 of 4.0 grams, the head assemblies 14 will operate under a total load of approximately 4.5 grams when the head suspensions are in engagement with the ramp structure.

Figure 4:
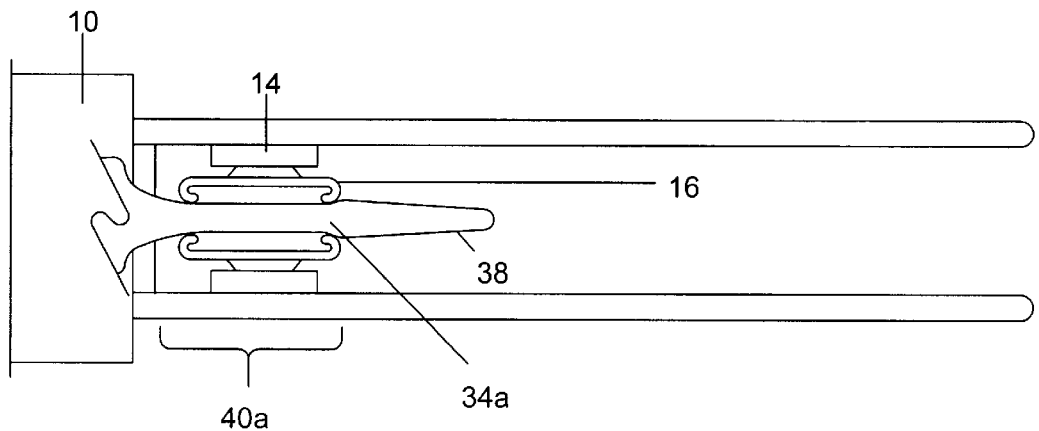
FIG. 4 is a simplified elevation view of a variation of the embodiment of FIGS. 2 through 3-3.

FIG. 4 shows a variation of the first embodiment of the invention. In this variation, it is envisioned that separate, non-related mechanisms are employed to latch the disc drive actuator at the park position in the absence of power. FIG. 4 shows a pair of head assemblies 14 supported by head suspensions 16 and engaged with a pair of discs 8, as in FIGS. 3-1 through 3-3. FIG. 4 also shows a modified ramp portion 34a of the ramp structure (30 in FIG. 2). This modified ramp portion 34a includes a double-beveled end portion 38 similar to the end portion 38 of FIGS. 3-1 through 3-3. The park portion, shown generally at 40a, does not include the detent feature previously described. That is, the park portion 40a is a flat surface, parallel with the disc surfaces, and extending from the lowermost point of the beveled ramp face of the end portion 38.

Removal of the detent feature minimizes the effect of torsional force differences applied to the head suspensions 16 to just those portions of the range of motion of the actuator where the head suspensions 16 are in contact with the end portion 38 of the ramp portion 34.

Figure 5:
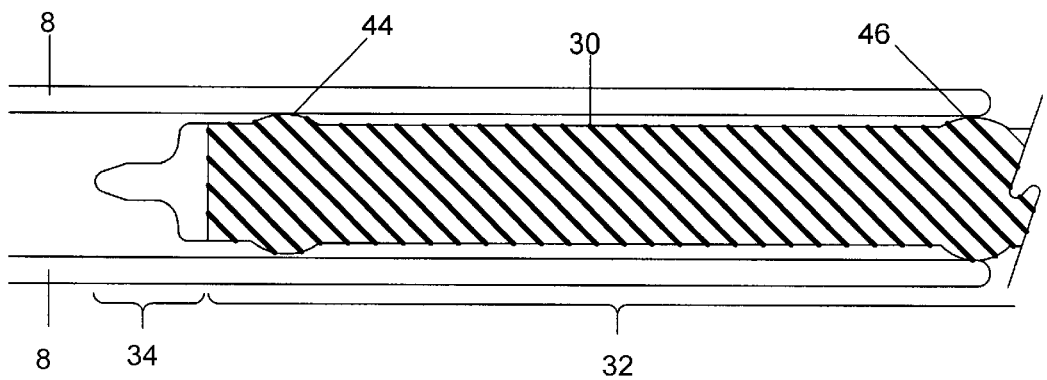
FIG. 5 is a simplified sectional view, taken along line A–A' of FIG. 2, showing another aspect of the invention.

Yet another aspect of the present invention is shown in FIG. 5. FIG. 5 is a simplified diagrammatic elevation and sectional view, taken substantially along line A–A' of FIG. 2, and shows the arm portion 32 of the ramp structure 30 of the present invention. Returning for the moment to FIG. 2, the arm portion 32 of the ramp structure 30 can be seen to include an arm snubber feature 44 near the juncture of the arm portion 32 and the ramp portion 34, and a disc snubber feature 46 overlaying the outer diameter of the disc 8.

FIG. 5 shows a single arm portion 32 positioned between two adjacent discs 8, and also shows the arm snubber features 44 and disc snubber features 46. One of skill in the art will appreciate that the scope of the invention is envisioned to be wide enough to encompass disc drives having both greater and lesser numbers of discs 8.

As can be seen in the figure, both the arm snubber features 44 and disc snubber features 46 are substantially spherical in form, and extend into close proximity to the surfaces of the discs. Since the arm portions 32 extend radially over the discs 8 from the mounting portion (31 in FIG. 2), any mechanical shock applied in an axis normal to the discs 8 will result in axial displacement of the distal ends of the arm portion 32. The arm snubber features 44 act to limit the amount of axial displacement of the arm portions 32 due to applied mechanical shocks, and thus to maintain the ramp portion 34 in substantially its intended relationship to the discs 8. This also serves to maintain the amount of extra load force applied by the ramp portion 34 to the head suspensions (16 in FIGS. 1 and 2) and thus to the head assemblies (14 in FIGS. 1 and 2).

Mechanical shocks applied to the disc drive in an axis normal to the disc surfaces also tend to axially displace the outer diameters of the discs 8 from their nominal axial position, the phenomenon known in the industry as "disc coning". The disc snubbing features 46, since they are positioned close to the mounting portion 31 of the ramp structure and lie axially over the outer diameters of the discs 8, act to limit the extent of disc coning, providing an additional benefit to the overall functionality of the disc drive.

Although FIG. 5 shows the arm snubber features 44 and disc snubber features 46 as being formed as integral portions of the arm portion 32, one of skill in the art will realize that these elements can also be formed as separate components, and attached to the arm portions 32 should this be desired. For instance, if the ramp structure (30 in FIG. 2) is formed of aluminum, magnesium or other metals, it may be desirable to form the arm and disc snubber features 44, 46 from a plastic in order to minimize the possibility that contact between the snubber features 44, 46 and the discs 8 will cause damage to the discs 8.

Figure 6:
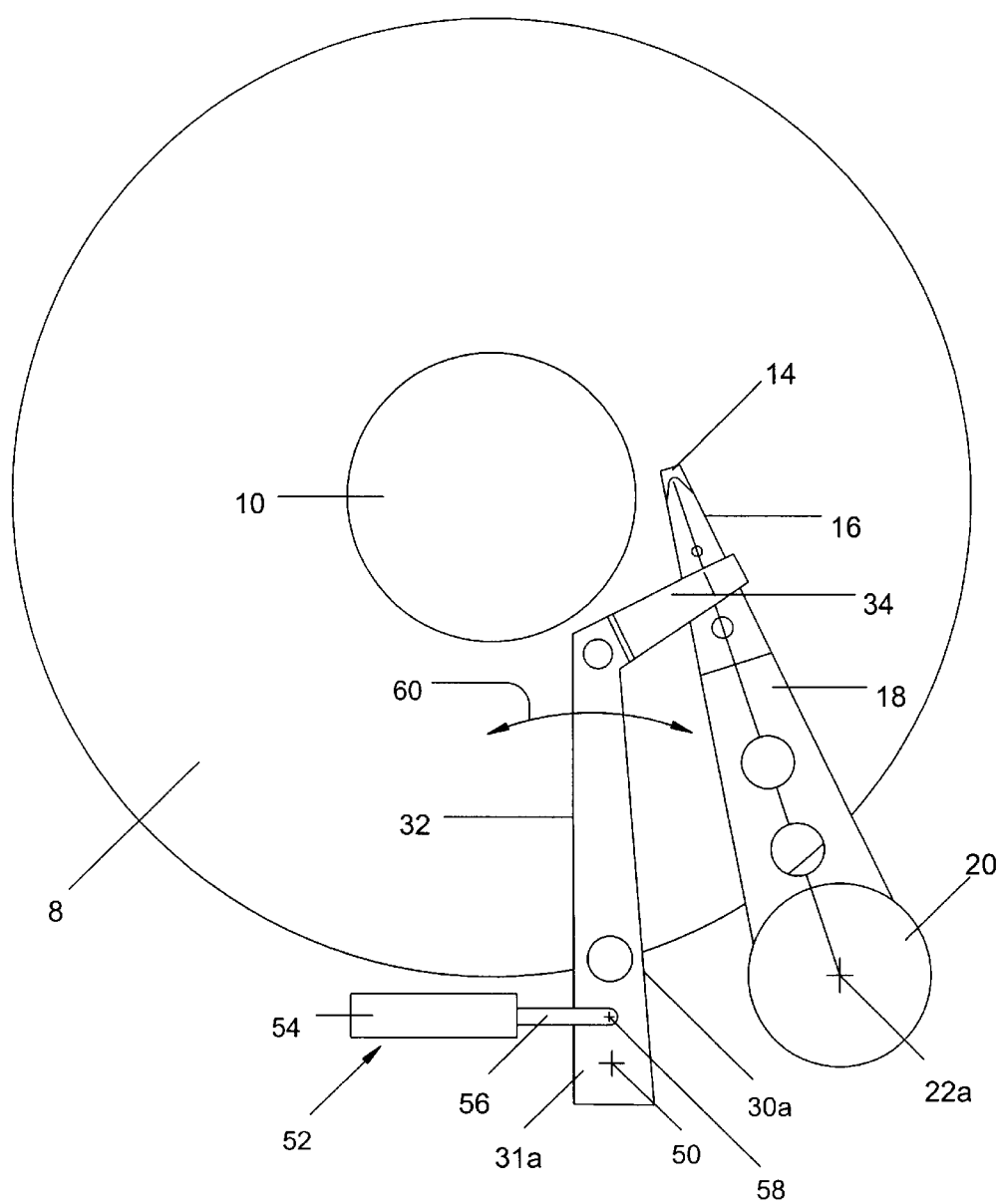
FIG. 6 is a simplified plan view of a disc drive showing a second embodiment of the present invention.

FIG. 6 shows a simplified plan view of a second alternative embodiment of the present invention. In the figure, a stack of discs 8 is shown mounted for rotation on the hub of a spindle motor, shown generally at 10. Also shown is an actuator body 20 pivotable about a pivot shaft, represented by pivot axis 22a. The actuator body 20 supports a plurality of actuator head mounting arms 18, which in turn mount head suspensions 16 supporting read/write head assemblies 14, all in a manner similar to that described above in the discussion of FIGS. 1 and 2.

This embodiment of the invention also includes a ramp structure 30a which further includes arm portions 32 and ramp portions 34, similar in form and function to corresponding elements described above in the discussions of FIGS. 2 through 5.

The principal difference between this embodiment of the invention and the embodiment previously described lies in the mounting of the ramp structure 30a and attendant functional differences.

Specifically, FIG. 6 shows that the mounting portion 31a of the ramp structure 30a is pivotable about a pivot axis 50 in relationship to the disc drive housing base member (4 in FIG. 1). The pivot axis 50 is parallel to the spin axis of the spindle motor 10 and the pivot axis 22a of the actuator body 20, and is thus normal to the surfaces of the discs 8. Since one of skill in the art would be capable of designing various mechanisms to implement the pivoting action of the ramp structure 30a, the specific form of the pivot mechanism is not considered as limiting to the scope of the present invention.

This alternative embodiment also includes a ramp structure pivot actuator, shown generally at 52. The example ramp structure pivot actuator shown consists of a linear bistable solenoid 54, fixedly mounted to the disc drive housing base member (4 in FIG. 1), which includes a plunger shaft 56 pivotably attached to the ramp structure 30a at a secondary pivot point 58. The linear solenoid 54 is shown in FIG. 6 with its plunger shaft 56 fully extended, and the ramp structure 30a engaging the head suspensions 16 in a manner similar to that of FIG. 2. Energization of the solenoid 54 is envisioned to extend and withdraw the plunger shaft 56, causing the ramp structure 30a to move generally along the path shown by double-headed arrow 60.

When the plunger shaft 56 of the solenoid 54 is drawn into the solenoid, i.e., moved to the left in the figure, the ramp structure is pivoted counterclockwise to the extent that there is no engagement with the head suspensions 16. This allows the disc drive to operate under normal conditions in a normal prior art manner over the full operational range of the head actuator mechanism.

It is only when the disc drive enters a non-operational condition, i.e., when power to the disc drive is lost, or when the disc drive enters "sleep" mode, that the ramp structure of the present embodiment comes into play. When the disc drive enters a non-operational condition, the head actuator moves the heads 14 to a park position, as shown in FIG. 6. The ramp structure actuator mechanism 52 also acts to rotate the ramp structure 30a clockwise to the position shown in FIG. 6. These actions serve to bring the ramp structure 30a into engagement with the head suspensions 16 in a manner similar to that described above for the first embodiment of the invention. That is, the ramp portion 34 engages the upper side of the head suspensions 16 and acts to encourage the head assemblies 14 into contact with the discs 8. Since the disc drive is in a non-operational condition, when the discs 8 stop spinning, the head assemblies 14 come to rest on the surfaces of the discs 8, and the ramp structure 30a acts to prevent any separation of the heads from the discs 8 due to the application of mechanical shocks, thus preventing head-slap damage to the heads, discs or both.

While an example ramp structure actuator mechanism 52 is shown for illustration of this second embodiment of the invention, alternative actuator mechanisms, such as voice coil motors, spring-activated or wind-vane-activated mechanisms are presently envisioned to fall within the scope of the present invention. The specific mechanism utilized to rotate the ramp structure 30a should not, therefore, be considered as limiting to the scope of the present invention.

The advantage of the embodiment of FIG. 6 over the embodiment of FIG. 2 is that the head suspensions 16 of FIG. 6 are not subjected to the unbalanced load forces exerted by the beveled end portions (38 in FIG. 3-1) of the ramp portions 34 during operational conditions. That is, the unbalanced loading of the head suspension 16, most clearly seen in FIG. 3-2, occurs only when the head assemblies 14 are at or moving to the park position, and is not experienced during normal operational conditions because the ramp structure 30a is rotated counterclockwise out of the operational range of the head assemblies during normal operation.

Figure 7:
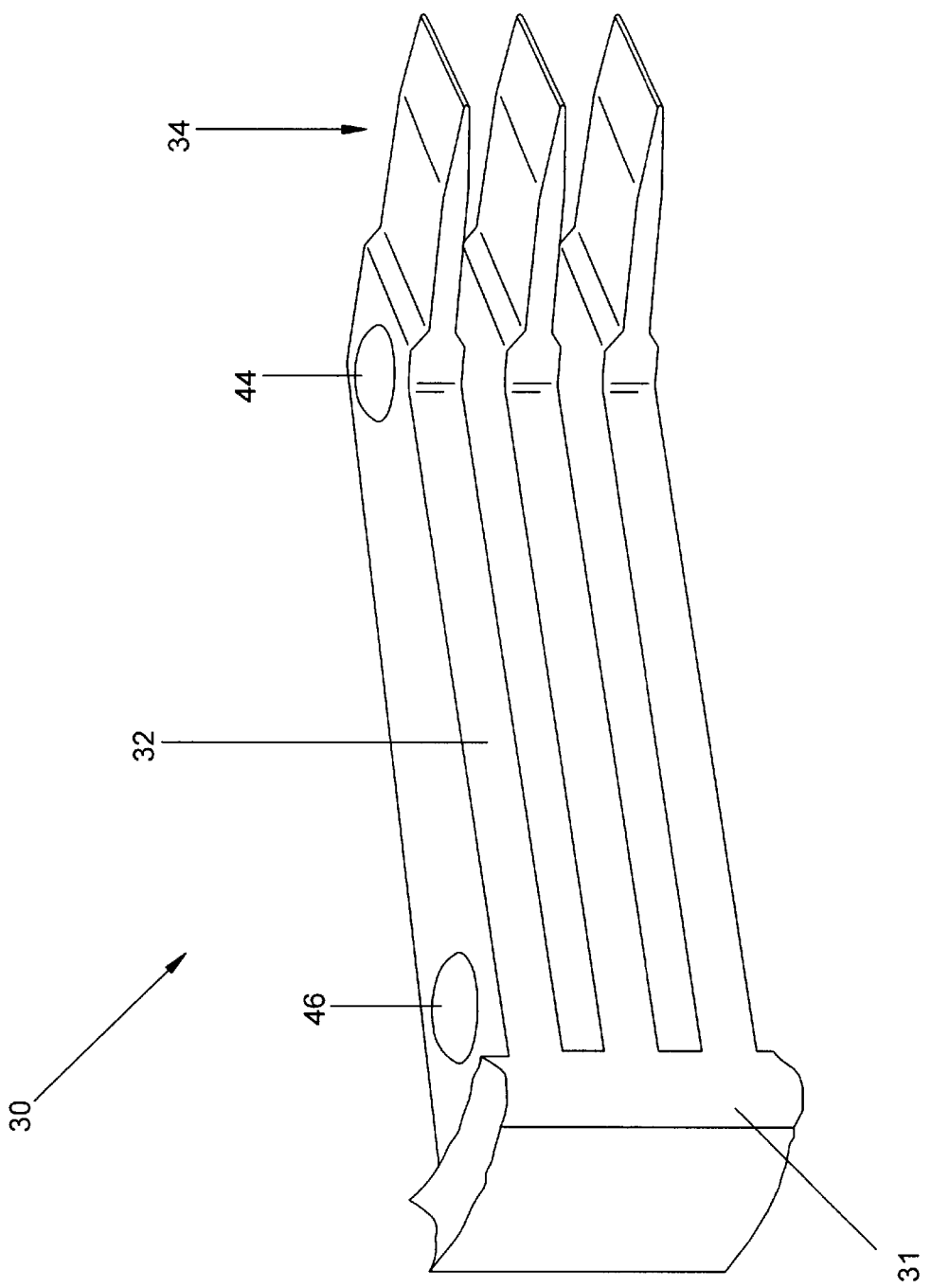
FIG. 7 is a partial perspective view of a ramp structure which forms a portion of the present invention.

FIG. 7 is a simplified partial perspective view of a ramp structure 30 which forms a portion of the present invention. The figure shows three arm portions 32, with extending ramp portions 34, attached to each other by the mounting portion 31, and extending therefrom in a comb-like manner. The mounting portion 31 is shown broken at its top and bottom extremes to designate that the ramp structure 30 can consist of additional arm portions 32. One of skill in the art will realize that the ramp structure 30 could also include a lesser number of arm portions 32, and that the arm portions 32 associated with the topmost and bottommost head assemblies in the disc drive need not include ramp bevels on both their upper and lower sides, but can instead be reduced in thickness and include ramp bevels only on the side of the arm portion 32 closest to the discs.

FIG. 7 also clearly shows the location and form of the optional arm snubber and disc snubber features 44, 46. Once again, it should be recalled that the arm and disc snubber features 44, 46 can be formed integrally with the other elements of the ramp structure 30, or separately fabricated and mounted to appropriate mounting features on the ramp structure 30.

One of skill in the art will also appreciated that the mounting portion 31 of FIG. 7 is readily adaptable to either the fixed mounting scheme of the embodiment of FIG. 2 or the pivotable mounting scheme of the embodiment of FIG. 6.

Once again, for purposes of the following claims, the terms "up", "upper", "top" and other related directional references will be interpreted to mean the direction and component surfaces away from the disc surfaces, while complementary terms, such as "down", "lower", "bottom" and other related directional references will be interpreted to mean the direction and component surfaces toward the disc surfaces.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. In a device including a disc and head assemblies supported in cooperative relationship to a surface of the disc by a head suspension attached to an actuator such that the head assemblies are movable across the surface of the disc, a system for providing increased load force to the head assemblies comprising:
   a base;
   a ramp structure further including:
      an arm extending over the surface of the disc, the arm having an attached end attached to the base beyond an outer diameter of the disc and a free end, the free end positioned closer to an inner diameter of the disc than the outer diameter of the disc; and
      a ramp portion at the free end of the arm for engaging the head suspension and maintaining the head assemblies in a position near the surface of the disc, wherein the ramp structure is located on a side of the actuator facing the inner diameter of the disc.

2. The system of claim 1, further comprising an arm snubber feature positioned near the free end of the arm.

3. The system of claim 1, further including a ramp structure actuator mechanism for pivoting the ramp structure between a non-contacting operational position and a contacting non-operational position.

4. The system of claim 1 wherein the arm of the ramp structure is fixedly mounted in relationship to the base.

5. The system of claim 1 wherein the ramp structure is pivotably mounted in relationship to the base.

6. The system of claim 1 further comprising a second disc, wherein the arm fits between the discs.

7. The system of claim 6 wherein the ramp portion of the ramp structure has a double beveled end forming a first ramp for a first head assembly and a second ramp for a second head assembly.

8. The system of claim 1 wherein the head suspensions include a contact feature adapted for contact with the ramp portion.

9. The system of claim 1 wherein the ramp structure is substantially L-shaped.

10. The system of claim 1 in which the free end of the arm is beveled from a narrow portion formed at the free end of the arm to a thicker portion near the free end of the arm.

11. The system of claim 1 wherein the ramp structure further includes a detent.

12. The system of claim 11 further comprising a disc snubber feature positioned near the attached end of the arm.

13. The system of claim 11 wherein the arm has a first surface and a second surface, the arm comprising:
- a first disc snubber feature positioned near the attached end of the arm on the first surface of the arm; and
- a second disc snubber feature positioned near the attached end of the arm on the second surface of the arm.

14. In a disc drive including at least one disc mounted for rotation on a spindle motor and a vertically aligned array of head assemblies supported in cooperative relationship to surfaces of the discs by head suspensions, the head suspensions attached to a movable actuator which moves the head assemblies across the surfaces of the at least one disc, a system for providing increased load force to the head assemblies comprising:
- a base;
- a ramp structure further including:
  - an arm extending over the surface of the at least one disc, the arm having an attached end attached to the base near the outer diameter of the at least one disc and a free end, the free end positioned closer to the inner diameter of the at least one disc than the outer diameter of the at least one disc;
  - a ramp portion attached to the free end of the arm, the ramp portion for engaging the head suspensions and maintaining the head assemblies in a position near the at least one disc, when the head assemblies are moved to a park position near the inner diameter of the at least one disc;
  - a first arm snubber feature positioned near the free end of the arm on the first surface of the arm; and
  - a second arm snubber feature positioned near the free end of the arm on the second surface of the arm.

15. A ramp structure for use within a disc drive, the disc drive including at least one disc having an inner diameter and an outer diameter, the ramp structure comprising:
- an elongated arm, wherein the arm has a first surface and a second surface; and
- a ramp portion attached to one end of the arm, the ramp portion positioned closer to the inner diameter of the at least one disc than the outer diameter of the at least one disc, the ramp portion further comprising:
  - a first ramp surface;
  - a second ramp surface;
  - a first arm snubber feature positioned near the one end of the arm on the first surface of the arm; and
  - a second arm snubber featured positioned near the one end of the arm on the second surface of the arm.

16. The ramp structure of claim 15 wherein the first ramp surface includes a detent and the second ramp surface includes a detent.

17. The ramp structure of claim 15 wherein the ramp structure is substantially L-shaped.

* * * * *